United States Patent
Kasai et al.

(10) Patent No.: US 10,800,343 B2
(45) Date of Patent: Oct. 13, 2020

(54) ONBOARD ELECTRONIC DEVICE MOUNTING STRUCTURE

(71) Applicants: HONDA MOTOR CO., LTD., Minato-ku, Tokyo (JP); Nifco Inc., Yokosuka-shi, Kanagawa (JP)

(72) Inventors: Keita Kasai, Wako (JP); Tadahiro Matori, Wako (JP); Hajime Naoi, Yokosuka (JP)

(73) Assignees: HONDA MOTOR CO., LTD., Minato-Ku, Tokyo (JP); NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 16/344,568

(22) PCT Filed: Oct. 12, 2017

(86) PCT No.: PCT/JP2017/036934
§ 371 (c)(1),
(2) Date: Apr. 24, 2019

(87) PCT Pub. No.: WO2018/092473
PCT Pub. Date: May 24, 2018

(65) Prior Publication Data
US 2020/0047683 A1    Feb. 13, 2020

(30) Foreign Application Priority Data
Nov. 18, 2016 (JP) .................................. 2016-225256

(51) Int. Cl.
*B60R 11/02* (2006.01)
*B60R 11/04* (2006.01)
(Continued)

(52) U.S. Cl.
CPC .............. *B60R 11/02* (2013.01); *B60R 11/04* (2013.01); *H04N 5/2253* (2013.01); *B60R 2011/0026* (2013.01)

(58) Field of Classification Search
CPC . B60R 11/02; B60R 11/04; B60R 2011/0026; H04N 5/2253; H04N 5/225; H05K 5/02
(Continued)

(56) References Cited

U.S. PATENT DOCUMENTS 6,135,528 A * 10/2000 Sobieski ................... B60R 7/04
224/311
9,487,156 B2 * 11/2016 Frenzel ................... B60R 11/02
(Continued)

FOREIGN PATENT DOCUMENTS

JP   2012504518 A   2/2012
JP   2012166615 A   9/2012
(Continued)

OTHER PUBLICATIONS

English translation of International Search Report for International Application No. PCT/JP2017/036934, dated Jan. 9, 2018, 2 pages.

*Primary Examiner* — Muhammad Ijaz
(74) *Attorney, Agent, or Firm* — Armstrong Teasdale LLP

(57) ABSTRACT

Provided is an onboard electronic device mounting structure that prevents rattling of the electronic device, and does not unduly limit the mounting space for other components. The mounting structure (1) secures a camera (2) to a window (W) of a vehicle via a mounting device (3). An engagement portion (14) provided in a front end side of the camera abuts against a base (8) of the mounting device, and a biased portion including a columnar member provided on a lateral side of the camera is supported by the base. A biasing member (18) of the base biases the biased portion against a supporting portion (17) of the base. The supporting portion is provided with two supporting surfaces (17a and 17b)
(Continued)

which support the biased portion with two reaction forces each at an angle to the direction of the biasing force of the biasing member.

8 Claims, 9 Drawing Sheets

(51) Int. Cl.
*H04N 5/225* (2006.01)
*B60R 11/00* (2006.01)

(58) Field of Classification Search
USPC .......................................... 248/208; 348/148
See application file for complete search history.

(56) References Cited

U.S. PATENT DOCUMENTS

| | | | | |
|---|---|---|---|---|
| 10,293,760 B2* | 5/2019 | Matori | ................ | G03B 17/561 |
| 2011/0233248 A1 | 9/2011 | Flemming et al. | | |
| 2012/0099849 A1* | 4/2012 | Onishi | ................ | G03B 17/561 |
| | | | | 396/419 |
| 2012/0207461 A1 | 8/2012 | Okuda | | |
| 2015/0041510 A1* | 2/2015 | Frenzel | ................ | B60R 11/02 |
| | | | | 224/482 |
| 2015/0042804 A1* | 2/2015 | Okuda | ................ | B60R 11/04 |
| | | | | 348/148 |
| 2015/0109447 A1* | 4/2015 | Okuda | ................ | B60R 11/04 |
| | | | | 348/148 |
| 2016/0023620 A1* | 1/2016 | Matori | ................ | H04N 5/2252 |
| | | | | 348/148 |
| 2016/0257261 A1 | 9/2016 | Kageyama et al. | | |
| 2016/0257265 A1* | 9/2016 | Kageyama | ................ | B60R 11/04 |
| 2017/0274836 A1* | 9/2017 | Kasai | ................ | B60R 11/04 |
| 2018/0154842 A1* | 6/2018 | Naoi | ................ | B60R 11/04 |
| 2018/0281696 A1* | 10/2018 | Uchiyama | ................ | B60R 1/00 |
| 2018/0361947 A1* | 12/2018 | Matori | ................ | B60R 11/04 |

FOREIGN PATENT DOCUMENTS

| | | |
|---|---|---|
| JP | 2015508728 A | 3/2015 |
| JP | 2016159876 A | 9/2016 |
| WO | 2014141357 A1 | 9/2014 |
| WO | 2016190153 A1 | 12/2016 |

* cited by examiner

ONBOARD ELECTRONIC DEVICE MOUNTING STRUCTURE

CROSS-REFERENCE TO RELATED APPLICATIONS

This application is a U.S. National Phase Application of PCT/JP2017/036934, filed Oct. 12, 2017, which claims the benefit of priority to JP Application No. 2016-225256, filed Nov. 18, 2016, the contents of which are hereby expressly incorporated by reference in their entirety.

TECHNICAL FIELD

The present disclosure relates to a structure for mounting an electronic device such as a camera and a sensor on a window of a vehicle, and in particular to a structure that can secure an electronic device onto a part of a vehicle without causing rattling.

BACKGROUND ART

An electronic device such as a camera and a sensor may be attached to a window of a vehicle for the purpose of assisting the driving of the vehicle or for achieving autonomous driving. If there is rattling between the electronic device and the vehicle, the accuracy of the data acquired by the electronic device deteriorates, so that the electronic device is required to be secured to the vehicle without causing any rattling.

For example, Patent Document 1 discloses a carrier device that is fixed to a front window of a vehicle while having a camera secured thereto. The carrier device has a carrier plate made of resin, a spring attached to the carrier plate to bias the camera in the inboard direction, and another spring attached to the carrier plate to bias the camera in the downward direction. In addition, the carrier plate is provided with a supporting piece erected from the main body thereof so that the distal end thereof opposes the main body of the carrier plate to support the camera biased in the inboard direction, and another supporting piece depending from a lower end of the main body of the carrier plate to support the camera biased in the downward direction. The carrier device can thus secure the camera without causing rattling by using a pair of springs and a pair of supporting pieces.

PRIOR ART DOCUMENT(S)

Patent Document(s)

Patent Document 1: JP2012-504518A

SUMMARY OF THE INVENTION

Task to be Accomplished by the Invention

However, the device disclosed in Patent Document 1 has a problem that a space is required for placing multiple springs to the carrier plate so that the mounting space for other components is unduly limited.

In view of such a problem of the prior art, the present invention provides an embodiment thereof in the form of an onboard electronic device mounting structure that prevents rattling of the electronic device, and does not unduly limit the mounting space for other components.

Means for Accomplishing the Task

To achieve such an object, at least some of possible embodiments of the present invention provide an onboard electronic device mounting structure (1) including a base (8) fixedly attached to a window (W) of a vehicle, and an electronic device (2) mounted on the base, wherein the electronic device includes a biased portion (15) provided on a first side of the electronic device with respect to a fore and aft direction and extending laterally from the electronic device, and an engagement portion (14) provided on a second side of the electronic device with respect to the fore and aft direction, and wherein the base includes a biasing member (18) resiliently biasing a side surface of the biased portion, a resting portion (19) supporting the engagement portion from below, and a supporting portion (17) supporting the biased portion against a biasing force of the biasing member, the supporting portion having two supporting surfaces (17a, 17b) forming different angles relative to a direction of the biasing force.

Owing to this arrangement, the biased portion of the electronic device receives the biasing force from the biasing member in one direction, and the reaction forces from the supporting portion in two different directions so that the rattling of the electronic device relative to the base can be prevented. As compared to the case where two separate biasing members directed in two different directions are employed, the cost is reduced, and the mounting space for other components is not limited.

According to an embodiment of the present invention, the base is provided with an abutting portion (20) abutting against an upper surface of the electronic device.

Owing to this arrangement, the abutting portion applies a supporting force opposing the supporting force applied by the resting portion to the electronic device such as a camera so that rattling can be prevented in an even more effective manner.

According to an embodiment of the present invention, the base further includes a receiving portion (16) receiving the engagement portion therein and having an inner surface part forming the resting portion, and the biasing force includes a component directed to insert the engagement portion into the receiving portion.

Thereby, tilting of the electronic device around a fulcrum provided by the engagement portion is facilitated so that the electronic device can be installed in the base with ease. Since the direction in which the engagement portion of the electronic device is inserted into the receiving portion coincides with the direction of a component of the biasing force, the space required in the insertion direction when installing the camera in the base is reduced as compared with the case where the component of the biasing force is applied in the opposite direction.

According to an embodiment of the present invention, the resting portion and the abutting portion are offset from each other in the fore and aft direction.

Thereby, the electronic device can be tilted around the fulcrum provided by the resting portion until the electronic device abuts against the abutting portion so that the electronic device can be installed in the base with ease.

According to an embodiment of the present invention, the biasing force includes a component directed in a vertical direction with respect to the vehicle.

Thereby, even when the vehicle causes vibrations directed in the vertical direction, no rattling occurs between the base and the electronic device.

According to an embodiment of the present invention, the two supporting surfaces each consist of a planar surface, and are provided adjacent to each other.

Thereby, the reaction forces can be applied from two directions to the biased portion which subjected to a biasing force without limiting the mounting space for other components.

According to an embodiment of the present invention, the biased portion consists of a columnar member projecting laterally from a main body of the electronic device.

Thereby, the structure of the biased portion can be simplified, and the mounting space for other components is not limited.

According to an embodiment of the present invention, the biasing member forms a cantilever extending downward from a main body of the base and is provided with a biasing planar surface (18a) abutting against the biased portion, the columnar member being provided with a side surface curved in a convex shape onto which the biasing planar surface abuts.

Thereby, even in the presence of manufacturing dimensional errors, the columnar member can be biased obliquely to the two supporting surfaces.

According to an embodiment of the present invention, the biasing planar surface is tilted with respect to a direction of a tilting movement of the electronic device around a fulcrum provided by the engagement portion when installing the electronic device in the base, and is configured such that the biased portion is guided by the biasing planar surface to be supported by the supporting portion as the electronic device is tilted around the fulcrum provided by the engagement portion when installing the electronic device in the base.

Thereby, the biasing planar surface not only biases the biased portion but also serves as a guide for installing the electronic device in the base so that the electronic device can be installed in the base with ease.

According to an embodiment of the present invention, the base comprises a first member (5) configured to be secured to a side of the window, and a second member (6) retaining the electronic device, and the first member and the second member are joined to each other.

Thus, by installing a window to the vehicle body with the first member fixedly secured to the window, assembling the interior members, and then connecting the second member with the camera retained thereto to the first member, these components are prevented from interfering with the assembly of other components, as opposed to the cases where the window is installed to the vehicle body with the entire base secured to the window, followed by the assembly of the interior members, and where the interior members are assembled, and the entire base is then fixedly attached to the window.

Effects of the Invention

An embodiment of the present invention thus provides an onboard electronic device mounting structure that prevents rattling of the electronic device, and does not unduly limit the mounting space for other components.

MODES FOR CARRYING OUT THE INVENTION

Figure 1:
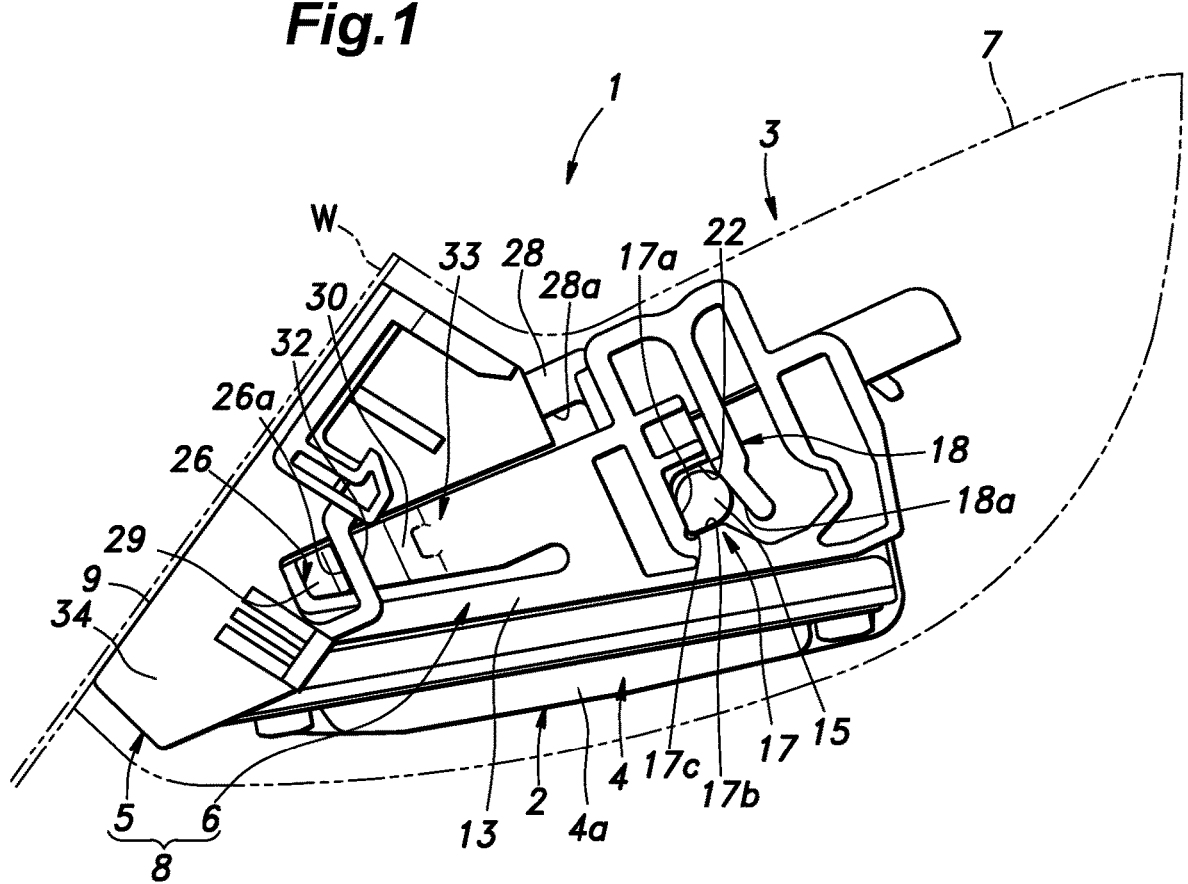
FIG. 1 is a side view of an onboard electronic device mounting structure according to an embodiment of the present invention.
Figure 2:
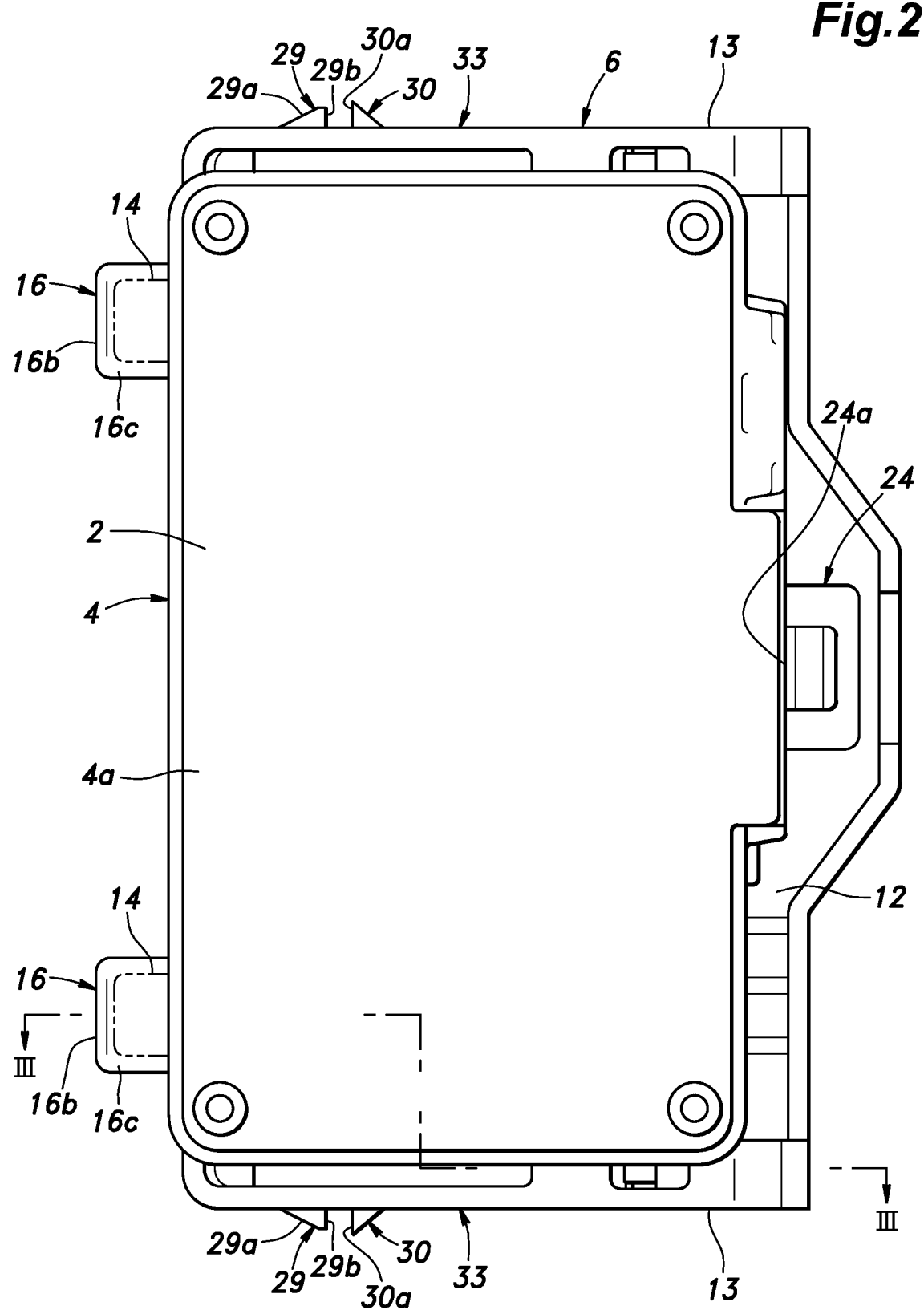
FIG. 2 is a bottom view (excluding a cover) of the onboard electronic device mounting structure.
Figure 3:
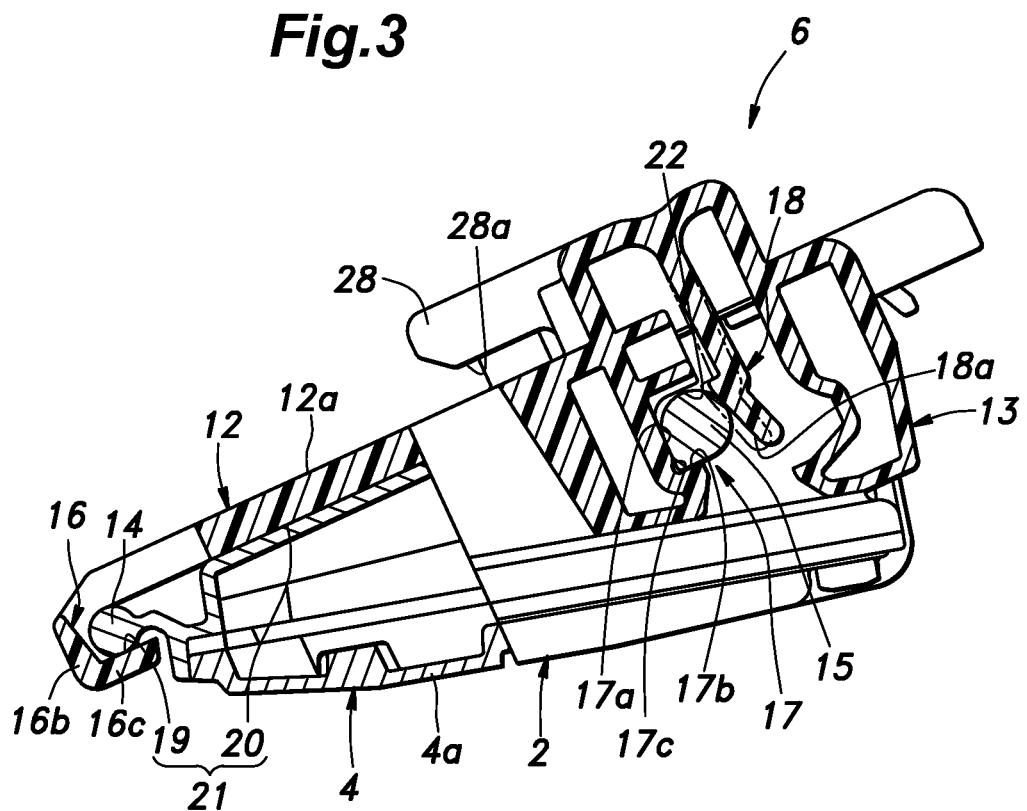
FIG. 3 is a sectional view taken along line of FIG. 2.

An onboard electronic device mounting structure 1 according to an embodiment of the present invention is described in the following with reference to the appended drawings. Unless otherwise specified, the front, rear, right, left, up and down directions are based on the orientation of the electronic device as mounted on a vehicle. (As the structure is substantially symmetric about a vertical longitudinal plane, only the components on one side of the structure may be discussed in some part of the following structure to avoid verbosity.) As shown in FIGS. 1 to 3, the onboard electronic device mounting structure 1 is configured to mount a camera 2 to a front window W of a vehicle by using a mounting device 3. The present invention can be applied to a mounting structure not only for a camera but also for other electronic devices such as a sensor, and the part on which the electronic device is to be mounted is not limited to a front window W but may also be a rear window or a side window.

The camera 2 is covered by a housing 4 made of metal or resin. The housing 4 has a rectangular shape with a long side thereof extending in the lateral direction in plan view. The mounting device 3 comprises a first member 5 that is made of resin and is fixed to the front window W, a second member 6 that holds the camera 2 and is connected to the first member 5, and a cover 7 connected to the first member 5 to shield the first member 5, the second member 6 and the camera 2 from the view of the vehicle occupant. The first member 5, the second member and the cover 7 each consist of an integrally molded single member, but may also be comprised of a plurality of members. A base 8 composed of the first member 5 and the second member 6 holds the camera 2, and is itself attached to the front window W.

Figure 4:
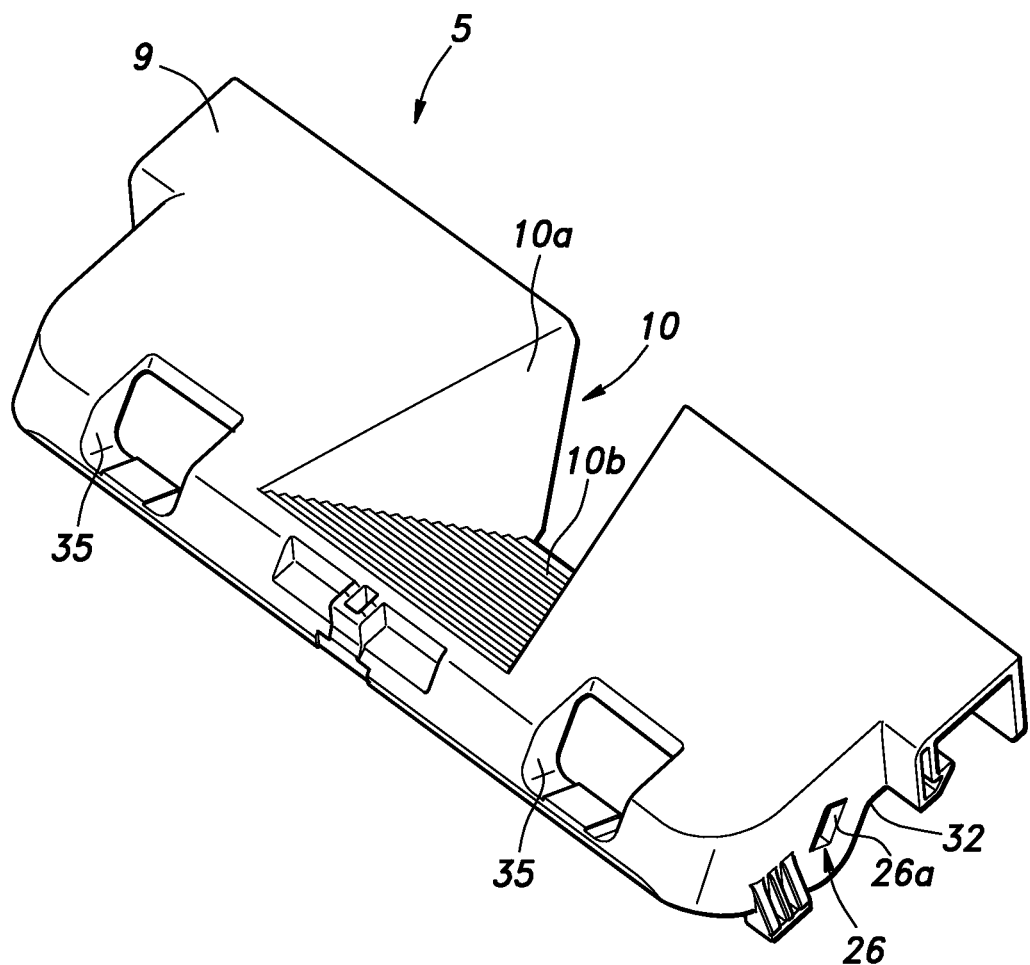
FIG. 4 is a perspective view of a first member of a base according to the embodiment.
Figure 5:
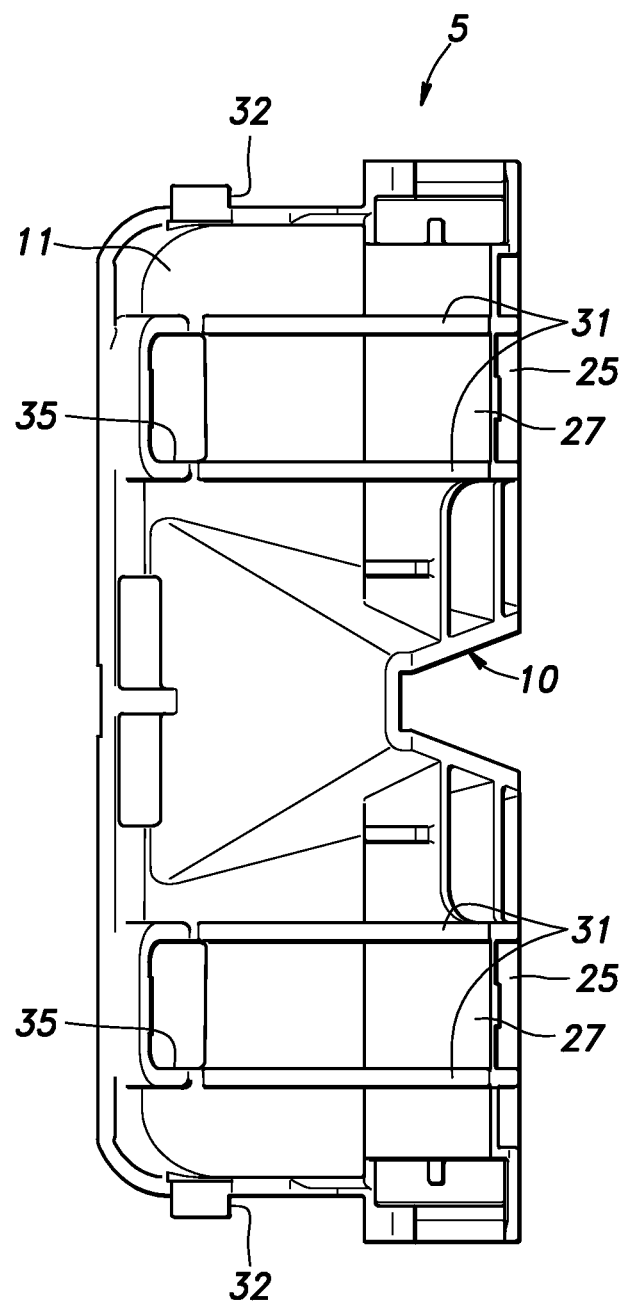
FIG. 5 is a bottom view of the first member of a base according to the embodiment.

As shown in FIGS. 4 and 5, the first member 5 has a rectangular shape with a long side thereof extending in a substantially lateral direction in plan view. The lateral width of the first member is greater than the lateral width of a main body 4a of the housing 4 of the camera 2. The first member 5 has an upper surface 9 which is inclined upward toward the rear, and the upper surface 9 of the first member 5 is attached to an upper end part of the inboard surface of a front window W by using double-side tape or an adhesive agent. The upper surface 9 is centrally provided with a recess 10, and a lens (not shown in the drawings) of the camera 2 is positioned in a lower and rear end part of the recess 10. The left and right side surfaces 10a and the bottom surface 10b of the recess 10 are inclined so as to spread laterally outward and downward toward the front by an angle greater than the viewing angle of the lens. The first member 5 is connected to the second member 6 at the side of a lower surface 11 thereof.

Figure 6:
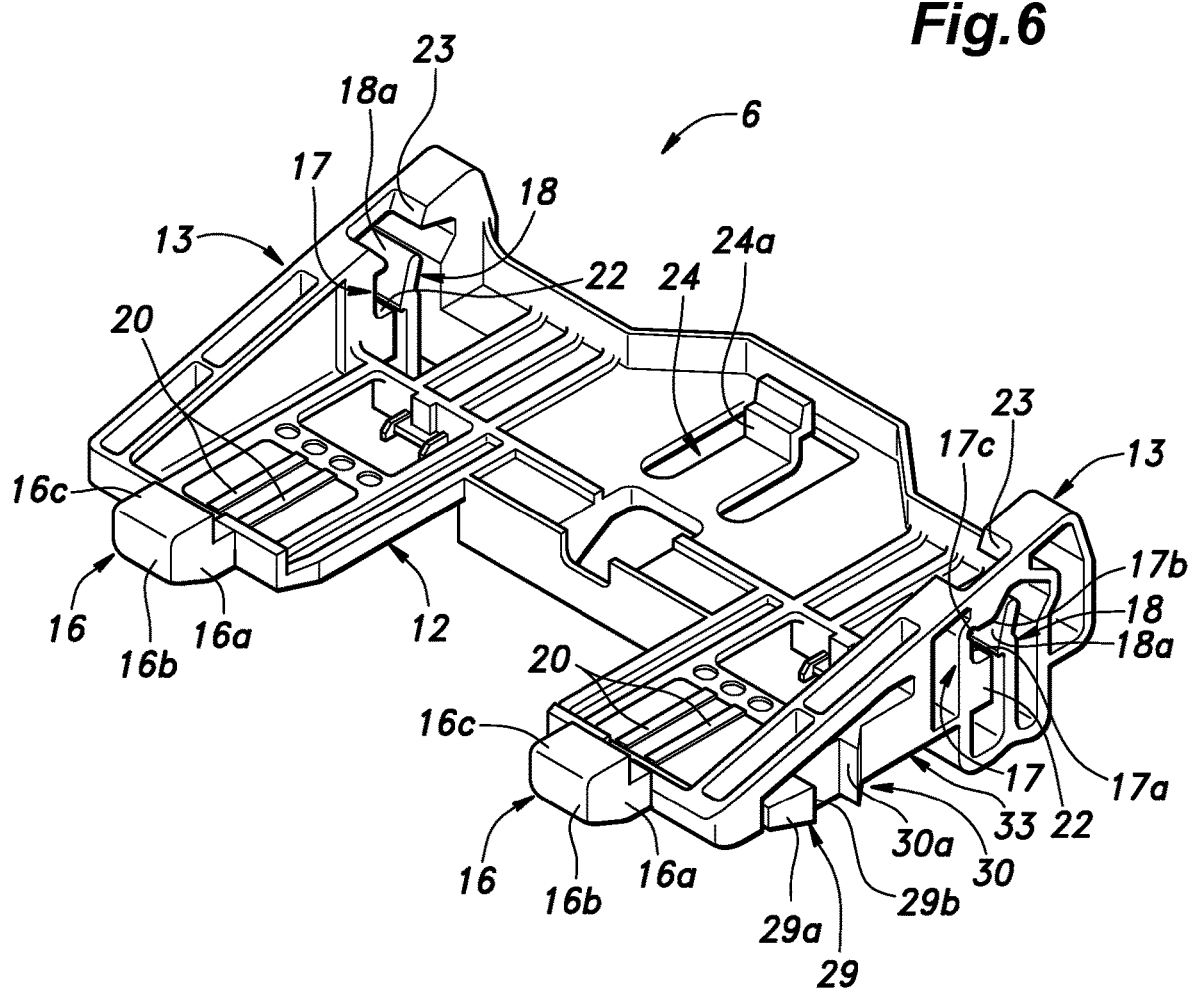
FIG. 6 is a perspective view of a second member of the base according to the embodiment as seen from the side of the lower surface.
Figure 7:
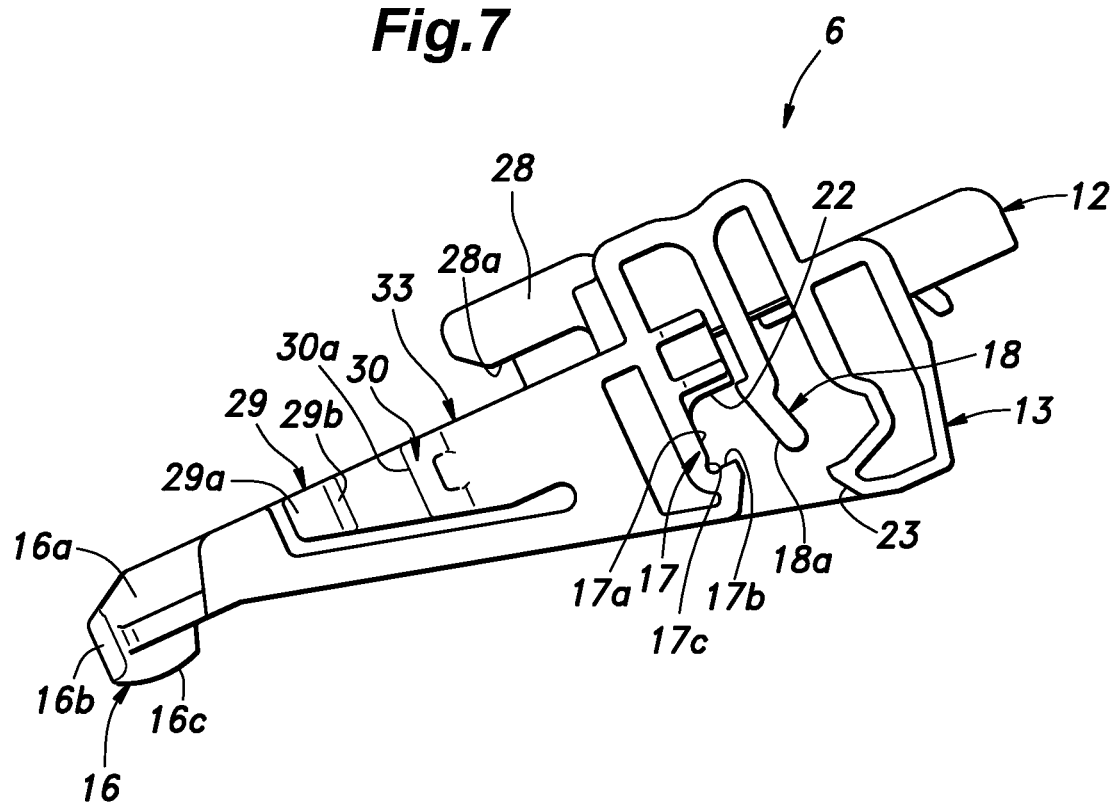
FIG. 7 is a side view of the second member of the base according to the embodiment.
Figure 8:
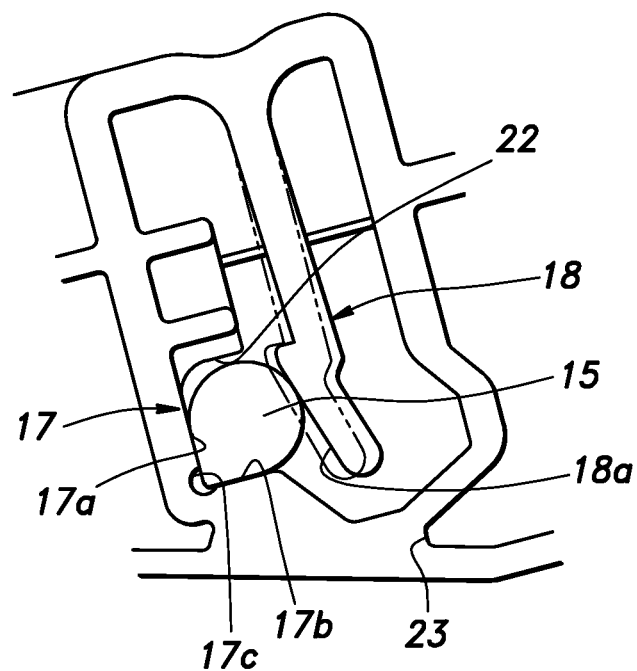
FIG. 8 is an enlarged side view of a camera and the second member of the base according to the embodiment.

As shown in FIGS. 6 to 8, the second member 6 has a main plate 12 having a substantially U shape in plan view and a pair side walls 13 depending downward from either lateral end of the main plate 12. The lateral width of the second member 6 is smaller than the lateral width of the first member 5, and is greater than the lateral width of the main body 4a of the housing 4 of the camera 2. The second member 6 is engaged by the first member 5 at an upper part and a front end thereof, and holds or retains the camera 2 on the lower side thereof.

Figure 9:
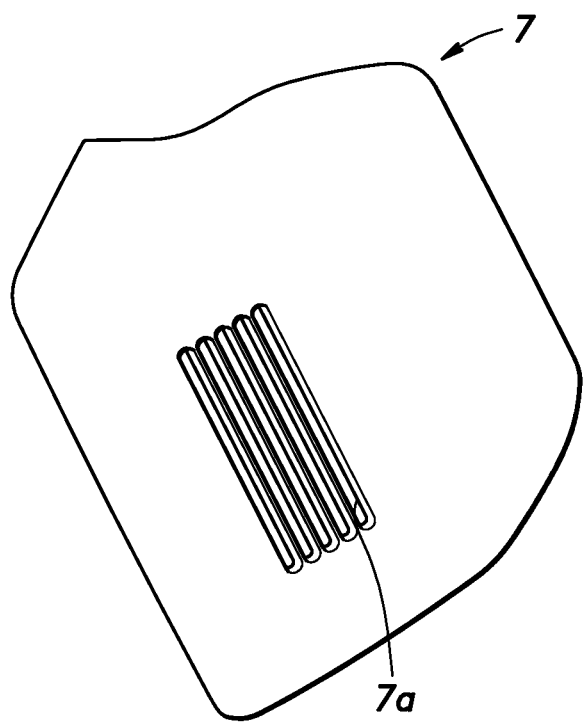
FIG. 9 is a perspective view of the cover according to the embodiment.

As shown in FIG. 9, the cover 7 receives the camera 2 and the base 8 therein, and is in close proximity to or abuts against the front window W at the front end side of the upper edge, and is in close proximity to or abuts against an interior member (not shown in the drawings) of the roof of the vehicle at the rear end side of the upper edge. The outer surface of the cover 7 is an ornamental surface facing the interior of the vehicle. The cover 7 is provided with ventilation holes 7a extending in the lateral direction.

The engaging structure between the various members, and the assembling method are described in the following.

Referring to FIGS. 2, 3, and 6 to 8, the engaging structure between the camera 2 and the second member 6, and the assembling method are described in the following. The housing 4 of the camera 2 has a pair of left and right engagement portions 14 projecting forward from the main body 4a, and a pair of biased portions 15 consisting of a pair of shaft members projecting sideways from the left and right side parts of the main body 4a, respectively. The second member 6 includes a pair of left and right receiving portions 16 which project from the front end of the main plate 12 to receive the respective engagement portions 14 of the camera 2, a pair of left and right supporting portions 17 which are formed on the respective side walls 13 to support the respective biased portions 15 of the camera 2, and a pair of left and right biasing members 18 formed on the respective side wall 13 to bias the respective biased portions 15 of the camera 2 toward the supporting portions 17.

Each receiving portion 16 of the second member 6 includes a pair of left and right side walls 16a, a front wall 16b connected between the front ends of the left and right side walls 16a, and a bottom wall 16c connected between the front end parts of the side walls 16a and the lower end of the front wall 16b. The upper side and the rear side of the bottom part of the receiving portion 16 are open. The upper surface of the bottom wall 16c is a flat surface, and forms a resting portion 19 which supports the corresponding engagement portion 14 of the camera 2 from below. The front end of each engagement portion 14 is preferably formed in a cylindrical columnar shape having a laterally extending axial line so that the rear end of the camera 2 may be vertically tilted around the fulcrum point at which the front end of the engagement portion 14 abuts against the corresponding resting portion 19.

The main plate 12 of the second member 6 preferably has abutting portions 20 which abut against the upper surface of the main body 4a of the housing 4 of the camera 2 when the camera 2 is mounted on the front side of the lower surface. The abutting portions 20 are preferably formed as ridges extending on the lower surface of the main plate 12 along the vertical direction. The abutting portions 20 are disposed so as to be offset in the fore and aft direction with respect to the resting portions 19, but may also be arranged so as to be aligned with the resting portions 19. In the latter case, each receiving portion 16 is provided with an upper wall (not shown in the drawings) connected between the upper ends of the side walls 16a so that the lower surface of the upper wall serves as the abutting portion which abuts against an upper part of the corresponding engagement portion 14 of the camera 2. The resting portions 19 and the abutting portions 20 jointly form clamping portions 21 for clamping onto the camera 2.

By forming a recess laterally recessed into each side wall 13 of the second member 6, the supporting portion 17 and the biasing member 18 of the corresponding side are defined. The surfaces of the supporting portion 17 and the biasing member 18 facing the recess are parallel to the lateral direction. The supporting portion 17 has a supporting rear surface 17a extending in a direction substantially orthogonal to the main plate 12 (obliquely rearward and upward in a state attached to the vehicle) and a supporting bottom surface 17b extending obliquely upward and forward from the lower end of the supporting rear surface 17a. The supporting rear surface 17a and the supporting bottom surface 17b are planes that intersect at an angle of 70° to 90°. A groove 17c extending in the lateral direction is provided at the intersection between the supporting rear surface 17a and the supporting bottom surface 17b. A stopper surface 22 extends rearward from the supporting rear surface 17a substantially in parallel to the main plate 12, and opposes the supporting bottom surface 17b from above. The stopper surface 22 is formed so as to be slightly separated from the biased portion 15 when the supporting portion 17 supports the biased portion 15.

Each biasing member 18 is formed by a cantilever leaf spring which has a base end located in an upper part of the side wall 13, and extends downward therefrom substantially orthogonally to the main plate 12. The free end side of the biasing member 18 is positioned behind the supporting portion 17, and is inclined rearward as one moves away from the base end side. The front surface of the free end side of the biasing member 18 forms a biasing planar surface 18a that presses the biased portion 15 toward the supporting portion 17. The biasing planar surface 18a forms an angle (angle other than 0° or 180°) with respect to the supporting rear surface 17a and the supporting bottom surface 17b. Both the biasing planar surface 18a and the supporting rear surface 17a are inclined rearward as one moves downward, but the inclination toward the rear is greater for the biasing planar surface 18a than for the supporting rear surface 17a.

A part of the lower side of each side wall 13 located under the supporting portion 17 and the biasing member 18 is formed a recess 23 which is recessed laterally from the inside to the outside in such a manner that the biased portion 15 of the camera 2 can move vertically into the recess 23. The front and rear walls surfaces of the recess 23 are preferably inclined so as to come closer to each other as one moves upward so that the biased portion 15 may be favorably guided into the supporting portion 17.

The biased portions 15 of the camera 2 are each formed as a columnar body extending in the lateral direction. Each biased portion 15 has a prescribed cross section taken along a plane orthogonal to the lateral direction. The lower part of the front face is a planar surface in contact with the supporting rear surface 17a, and the front part of the lower face is a planar surface in contact with the supporting bottom surface 17b. The part ranging from the upper part of the front face to the rear part of the lower face is a curved surface forming an arc corresponding to about ¾ of the circumference in cross section. The biased portion 15 is pressed by the biasing planar surface 18a at the curved surface.

In addition, the second member 6 is provided with a stopper 24 in the form of a cantilever extending from a laterally middle rear part of the main plate 12 to restrict a reward movement of the camera 2. The base end side of the stopper 24 extends rearward along the main plate 12 so as to extend in the same plane as the main plate 12, and the free end side of the stopper 24 is bent downward so as to define an engagement surface 24a facing forward orthogonally to the fore and aft direction as defined along the main plate 12. The engagement surface 24a is in contact with or in proximity to the rear end of the housing 4 of the camera 2.

A method of assembling the camera 2 to the second member 6 is described in the following. First of all, the engagement portions 14 of the camera 2 are inserted into the respective receiving portions 16 of the second member 6 until the engagement portions 14 are brought into contact with the respective resting portions 19. Subsequently, the camera 2 is tilted so as to raise the rear part thereof with the engagement portions 14 abutting against the supporting portions 19 so as to provide a fulcrum for this tilting movement. The biased portions 15 of the camera 2 are guided by the recesses 23 toward the supporting portions 17 and the biasing members 18, respectively. Once the biased portions 15 of the camera 2 are brought into contact with the biasing planar surfaces 18a of the biasing members 18 of the second member 6, the camera 2 is tilted further against the biasing force of the biasing members 18 with the result that the biased portions 15 are guided by the biasing planar surfaces 18a and eventually reach the supporting portions 17. The stopper surfaces 22 prevent excessive tilting of the camera 2.

Having reached the supporting portion 17, each biased portion 15 receives a biasing force orthogonal to the biasing planar surface 18a and reaction forces orthogonal to the supporting rear surface 17a and the supporting bottom surface 17b. Since the biasing force and the reaction forces are at an angle relative to one another, the biased portion 15 is placed in a stable condition owing to the equilibrium of the forces acting along the plane orthogonal to the lateral direction. The biased portion 15 is thus pushed against the supporting portion 17 by the biasing member 18 so that the second member 6 is enabled to hold the camera 2 without causing rattling. Even when there is any dimensional error in the abutting portion between the biased portion 15 and the supporting portion 17, such an error can be absorbed by the groove 17c. Owing to the abutting of the engagement portion 14 of the camera 2 against the resting portion 19, the downward movement of the camera 2 under the gravitation force and the rotation of the camera 2 around the biased portion 15 can be restricted. Further, in addition to the abutting between the engagement portion 14 and the resting portion 19, the camera 2 is clamped between the resting portion 19 and the abutting portion 20 with the abutting portion 20 abutting against the housing 4 of the camera 2 from above so that the position of the camera 2 can be stabilized. Since the fore and aft position (in the fore and aft direction defined the main plate 12) of the camera 2 is determined by the abutting of the biased portion 15 against the supporting rear surface 17a, the front end of the engagement portion 14 is spaced from the rear surface of the front wall 16b of the receiving portion 16. Since the engagement surface 24a of the stopper 24 engages the camera 2 from the rear, even when the vehicle is subjected to a severe fore and aft acceleration, the rearward movement of the camera 2 can be avoided.

The engagement structure provided between the first member 5 and the second member 6 is described in the following with reference to FIG. 1 to FIG. 7. The first member 5 and the second member 6 are configured such that the first member 5 is fixedly secured to the front window W, and the second member 6 is connected to the first member 5 with the camera 2 retained by the second member 6.

The first member 5 is provided with a pair of left and right blind holes 25 on the rear surface thereof, and a pair of side engagement holes 26 passed laterally through the side walls of the first member 5. The blind holes 25 are formed substantially in the fore and aft direction, and open out at the rear ends thereof. Further, the bottom surfaces of the blind holes 25 are formed by the upper surface of a flat plate-like bottom wall 27. The angle formed between the bottom wall 27 and the horizontal plane is smaller than the angle formed between the upper surface 9 of the first member 5 and the horizontal plane. The second member 6 has a pair of left and right overhang portions 28 extending above the main plate 12 from the rear to the front, and a pair of left and right front engagement claws 29 and a pair of left and right rear engagement claws 30.

The lower surface 28a of each overhang portion 28 is formed in parallel with the upper surface 12a of the main plate 12. When the overhang portion 28 is inserted into the blind hole 25 of the first member 5, the lower surface 28a of the overhang portion 28 slidingly contacts the bottom wall 27. A plurality of ridges 31 extending in the fore and aft direction along the bottom wall 27 are formed on the bottom surface of the bottom wall 27 so that when the overhang portion 28 is inserted into the blind hole 25 of the first member 5, the upper surface 12a of the main plate 12 slidingly contact the ridges 31. Therefore, when the overhang portions 28 are inserted into the blind holes 25, the bottom wall 27 of the first member 5 is sandwiched between the lower surfaces 28a of the overhang portions 28 of the second member 6 and the upper surface 12a of the main plate 12 so that the movement of the second member 6 relative to the first member 5 in a direction orthogonal to the bottom wall 27 (a vertical direction with a forward tilt) is restricted.

A part of the first member 5 behind each engagement hole 26 defines a rear end surface 32 extending substantially parallel to the rear face 26a of the engagement hole 26, and an open space is defined behind the rear end surface 32 (with respect to an insertion direction when inserting the overhang portion 28 into the blind hole 25). Each side wall 13 of the second member 6 is formed with a cantilever leaf spring 33 having a base end in the rear part thereof and extending in the fore and aft direction so that the free end can deflect in the lateral direction. The front engagement claw 29 and the rear engagement claw 30 are provided in the free end part and an intermediate part (with respect to the extending direction of the leaf spring 33) of the leaf spring 33. The front face 29a of the front engagement claw 29 defines a slanted plane that extends laterally outward toward the rear, and the rear face 29b of the front engagement claw 29 defines a plane extending orthogonally to the insertion direction (downward and forward oblique direction) when inserting the overhang portion 28 into the blind hole 25. The front face 30a of the rear engagement claw 30 defines a plane substantially in parallel to the rear face 29b of the front engagement claw 29. The distance between the rear face 29b of the front engagement claw 29 and the front face 30a of the rear engagement claw 30 is substantially equal to the distance between the rear face 26a of the engagement hole 26 and the rear end surface 32.

When the overhang portion 28 is inserted into the blind hole 25, at the same time as the overhang portion 28 and the bottom wall 27 are engaged with each other, the front engagement claw 29 and the rear engagement claw 30 are engaged by the rear face 26a of the engagement hole 26 and the rear end surface 32, respectively. As the front face 29a of the front engagement claw 29 slides on the laterally inwardly facing inner surface of the side wall 34 of the first member 5 defining the engagement hole 26, the leaf spring 33 deflects laterally inward. Once the front engagement claw 29 reaches the engagement hole 26, the front engagement claw 29 fits into the engagement hole 26 so that the leaf spring 33 is restored to the original position. At this time, the rear face 29b of the front engagement claw 29 and the rear face 26a of the engagement hole 26 are in contact with each other, and the front face 30a of the rear engagement claw 30 and the rear end surface 32 are brought into contact with each other so that the movement of the second member 6 relative to the first member 5 in the insertion direction (the fore and aft direction with a downward inclination toward the front) is restricted. Further, the outer surface of the side wall 13 of the second member 6 abuts against the inner surface of the side wall 34 of the first member 5 so that the movement of the second member 6 in the lateral direction with respect to the first member 5 is restricted.

The angle between the fore and aft direction and the insertion direction of the overhang portion 28 into the blind hole 25 (the angle formed between the bottom wall 27 and the horizontal plane) is smaller than the angle of the front window W or the upper surface 9 of the first member 5 relative to the fore and aft direction. Furthermore, the second member 6 is attached to the lower side of the first member 5. Therefore, even when the interior members are attached to the vehicle body, such interior members do not hinder the first member 5 to be attached to the second member 6. Therefore, after attaching the first member 5 to the front window W, the front window is fitted onto the vehicle body, and the interior members are attached to the vehicle body, the second member 6 having the camera 2 secured thereto can be attached to the first member 5. Thus, the assembling of the camera 2 to the vehicle and the assembling of the other members to the vehicle body can be carried out without interfering with each other. At this time, the receiving portions 16 of the second member 6 are received in through holes 35 provided at the front end of the first member 5. The through holes 35 prevent the fore and aft dimension of the onboard electronic device mounting structure 1 from being increased in spite of the presence of the engagement portions 14 and the receiving portions 16.

The cover 7 can be attached to the first member 5 after the first member 5 is attached to the front window W, and the second member 6 retaining the camera 2 is attached to the first member 5. For example, the cover 7 may be attached to the first member 5 by using the engaging means disclosed in Japanese Patent Application No. 2015-104239 or any other known engaging means.

Since the camera 2 receives a biasing force only in one direction from the biasing members 18, and receives reaction forces in two directions from the supporting portions 17, space for placing other components is not restricted as compared to the case where the camera 2 is held by biasing forces directed in two directions, and the corresponding reaction forces directed in two directions. Since the biasing members 18 are formed integrally with the second member 6, the material cost and the assembly cost can be minimized.

The present invention has been described in terms of a specific embodiment, but is not limited by such an embodiment, and can be modified in various ways without departing from the spirit of the present invention. For instance, the base may be composed of an integrally molded, one piece member. The biasing force of the biasing members may be directed to the rear or obliquely rearward instead of forward or obliquely forward. In the latter case, one of the supporting surfaces of the supporting members will face forward or obliquely forward. Further, the arrangement of the engagement portions and the biased portions of the camera may be reversed with respect to the fore and aft direction, and in this case, the arrangement of the clamping portions of the second member with respect to the biasing members and the supporting portions will be also reversed with respect to the fore and aft direction.

Glossary of Terms

| | | | |
|---|---|---|---|
| 1: | onboard electronic device mounting structure | | |
| 2: | camera (electronic device) | 3: | mounting device |
| 4: | housing | 4a: | housing main body |
| 5: | first member | 6: | second member |
| 8: | base | 14: | engagement portion |
| 15: | biased portion | 16: | receiving portion |
| 17: | supporting portion | | |
| 17a: | supporting rear surface | 17b: | supporting bottom surface |
| 18: | biasing member | 18a: | biasing planar surface |
| 19: | resting portion | 20: | abutting portion |
| 21: | clamping portion | W: | window |

The invention claimed is:

1. An onboard electronic device mounting structure including a base fixedly attached to a window of a vehicle, and an electronic device mounted on the base,
wherein the electronic device includes:
a biased portion provided on a first side of the electronic device and extending laterally from the electronic device, wherein the first side is one of a forward side and a rear side of the electronic device, and
an engagement portion provided on a second side of the electronic device, wherein the second side is the other of the forward side and the rear side of the electronic device,
wherein the base includes a biasing member resiliently biasing a side surface of the biased portion, a resting portion supporting the engagement portion from below, and a supporting portion supporting the biased portion against a biasing force of the biasing member, the supporting portion having two supporting surfaces forming different angles relative to a direction of the biasing force,
wherein the biased portion consists of a columnar member projecting laterally from a main body of the electronic device, and
wherein the biasing member forms a cantilever extending downward from a main body of the base and is provided with a biasing planar surface abutting against the biased portion, the columnar member being provided with a side surface curved in a convex shape onto which the biasing planar surface abuts.

2. The electronic device mounting structure according to claim 1, wherein the base is provided with an abutting portion abutting against an upper surface of the electronic device.

3. The electronic device mounting structure according to claim 2, wherein the base further includes a receiving portion receiving the engagement portion therein and having an inner surface part forming the resting portion, and the biasing force includes a component directed to insert the engagement portion into the receiving portion.

4. The electronic device mounting structure according to claim 3, wherein the resting portion and the abutting portion are offset from each other.

5. The electronic device mounting structure according to claim 1, wherein the biasing force includes a component directed in a vertical direction with respect to the vehicle.

6. The electronic device mounting structure according to claim 1, wherein the two supporting surfaces each consist of a planar surface, and are provided adjacent to each other.

7. The electronic device mounting structure according to claim 1, wherein the biasing planar surface is tilted with respect to a direction of a tilting movement of the electronic device around a fulcrum provided by the engagement portion when installing the electronic device in the base, and is configured such that the biased portion is guided by the biasing planar surface to be supported by the supporting portion as the electronic device is tilted around the fulcrum provided by the engagement portion when installing the electronic device in the base.

8. The electronic device mounting structure according to claim 1, wherein the base comprises a first member configured to be secured to a side of the window, and a second member retaining the electronic device, and the first member and the second member are joined to each other.

* * * * *